US010097452B2

(12) United States Patent
Lefebvre et al.

(10) Patent No.: US 10,097,452 B2
(45) Date of Patent: Oct. 9, 2018

(54) CHAINING OF INLINE SERVICES USING SOFTWARE DEFINED NETWORKING

(75) Inventors: Geoffrey Lefebvre, Montreal (CA); Erik Rubow, San Jose, CA (US); Ravi Manghirmalani, San Jose, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 684 days.

(21) Appl. No.: 13/556,456

(22) Filed: Jul. 24, 2012

(65) Prior Publication Data

US 2013/0272305 A1 Oct. 17, 2013

Related U.S. Application Data

(60) Provisional application No. 61/624,823, filed on Apr. 16, 2012.

(51) Int. Cl.
*H04L 12/721* (2013.01)
*H04L 12/851* (2013.01)
*H04L 12/725* (2013.01)

(52) U.S. Cl.
CPC .......... *H04L 45/38* (2013.01); *H04L 45/302* (2013.01); *H04L 45/306* (2013.01); *H04L 47/24* (2013.01)

(58) Field of Classification Search
CPC .. H04L 12/56; H04L 12/5689–12/5692; H04L 12/5695–12/5696; H04L 47/24–47/2491; H04L 63/1408–63/1425; H04L 63/306
See application file for complete search history.

(56) References Cited

U.S. PATENT DOCUMENTS

| | | | |
|---|---|---|---|
| 7,860,100 B2 | 12/2010 | Khalid et al. | |
| 8,170,038 B2 | 5/2012 | Belanger et al. | |
| 8,284,664 B1* | 10/2012 | Aybay et al. | 370/235 |
| 2005/0289244 A1 | 12/2005 | Sahu et al. | |
| 2009/0259810 A1 | 10/2009 | Baden et al. | |
| 2010/0290485 A1 | 11/2010 | Martini et al. | |
| 2010/0303083 A1* | 12/2010 | Belanger et al. | 370/401 |
| 2011/0055845 A1 | 3/2011 | Nandagopal et al. | |
| 2012/0163180 A1* | 6/2012 | Goel | 370/238 |
| 2012/0281540 A1* | 11/2012 | Khan et al. | 370/241 |

FOREIGN PATENT DOCUMENTS

| | | |
|---|---|---|
| EP | 1387553 A1 | 2/2004 |
| EP | 2226970 A1 | 9/2010 |
| WO | 2012/047885 A1 | 4/2012 |

OTHER PUBLICATIONS

International Search Report for PCT/IB2013/053017 dated Sep. 30, 2013; 4 pages.
Openflow 1.1 in Hardware: "I was wrong (again)"; Apr. 29, 2011; 3 pages.
"A 100 Gig Openflow 1.1 Switch"; Powerpoint slide downloaded from the Internet on Apr. 16, 2013; 1 page.
Li, Erran et al.: Mosaic: Policy Homomorphic Network Extension; May 13, 2010; 15 pages.

* cited by examiner

*Primary Examiner* — Eric A Myers

(74) *Attorney, Agent, or Firm* — Ericsson Inc.

(57) ABSTRACT

A system and method for steering traffic through a set of services is provided. A service path or chain is assigned to a received packet based on a classification of the packet. A position and/or a direction of the traffic in the service path can be determined based on the previous service performed on the traffic. A next destination for the traffic can be assigned in accordance with the assigned service chain and determined position and direction information.

24 Claims, 9 Drawing Sheets

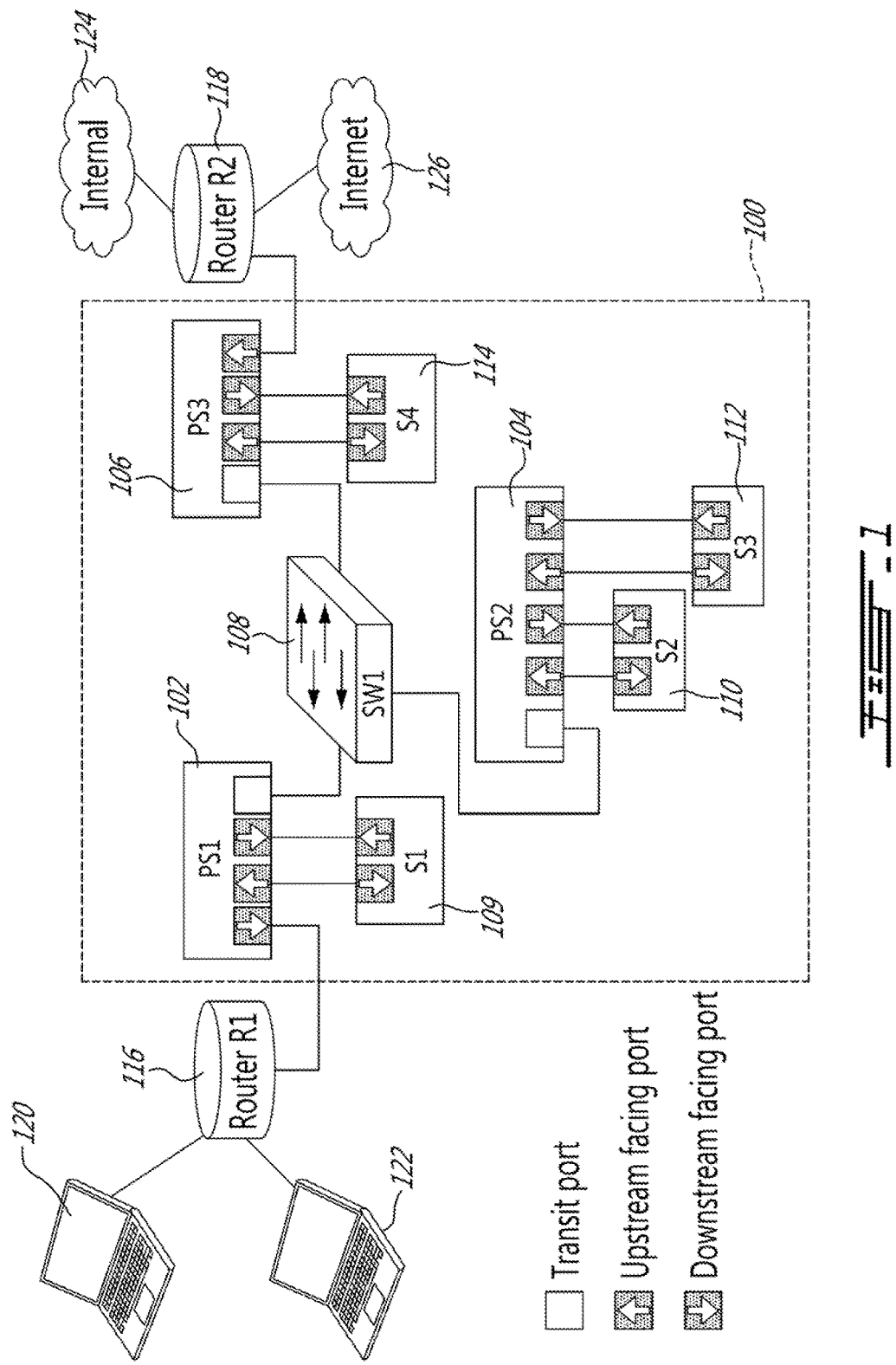

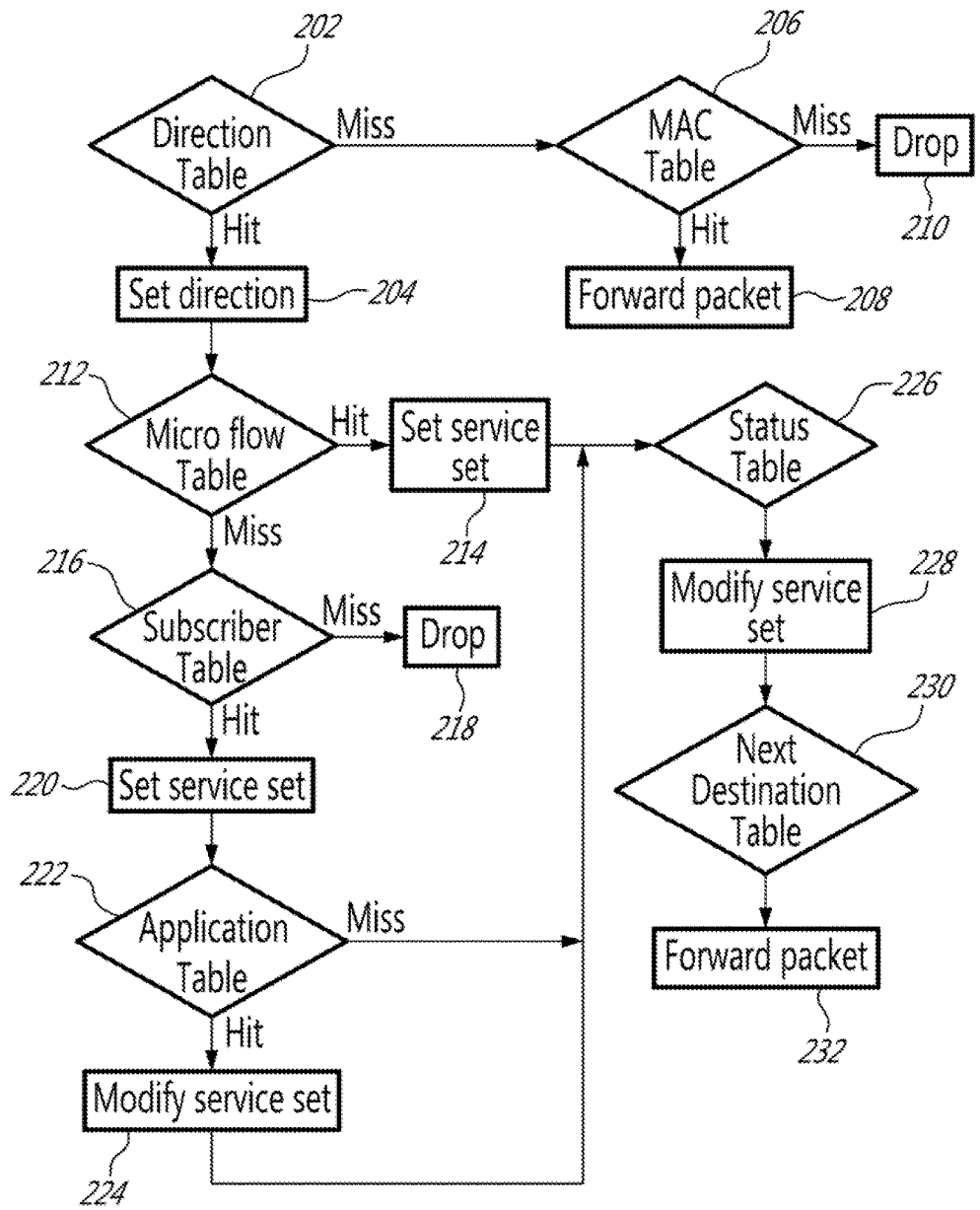

Configuration Data —300

| Subscriber | IP Address | Services up | Services down |
|---|---|---|---|
| Bob | 1.2.3.4/32 | {S1,S3} | {S1,S3} |
| Joe | 1.2.3.5/32 | {S2,S3} | {S3,S4} |

| Service | Down-facing MAC | Up-facing MAC |
|---|---|---|
| S1 | 00:00:00:00:0A:51 | 00:00:00:00:0B:51 |
| S2 | 00:00:00:00:0A:52 | 00:00:00:00:0B:52 |
| S3 | 00:00:00:00:0A:53 | 00:00:00:00:0B:53 |
| S4 | 00:00:00:00:0A:54 | 00:00:00:00:0B:54 |

| Router | Type | MAC |
|---|---|---|
| R1 | upstream | 00:00:00:00:00:01 |
| R2 | downstream | 00:00:00:00:00:02 |

| Application | IP Adress | Protocol | Port | Up | Down |
|---|---|---|---|---|---|
| Special site | 4.3.2.1/32 | TCP | 80 | +S2,-S3 | -S3 |
| Internal stuff | 3.2.1.0/24 | * | * | -S1 | -S1 |

| Direction | Global Service Order |
|---|---|
| Up | S2 -> S1 -> S3 -> S4 |
| Down | S2 -> S3 -> S4 -> S1 |

| Perimeter Switch | Port | MAC |
|---|---|---|
| PS2 | 0 | 00:00:00:00:F2:00 |
| PS2 | 1 | 00:00:00:00:F2:01 |
| PS2 | 2 | 00:00:00:00:F2:02 |
| PS2 | 3 | 00:00:00:00:F2:03 |
| PS2 | 4 | 00:00:00:00:F2:04 |

FIG. 3

Direction Table — 410

| Ingress Port | Action |
|---|---|
| 1 | dir = down |
| 2 | dir = up |
| 3 | dir = down |
| 4 | dir = up |

FIG. 4a

MAC Table — 420

| Destination MAC Address | Action |
|---|---|
| 00:00:00:00:0A:52 | set smac = 00:00:00:00:F2:01 output on port 1 |
| 00:00:00:00:0B:52 | set smac = 00:00:00:00:F2:02 output on port 2 |
| 00:00:00:00:0A:53 | set smac = 00:00:00:00:F2:03 output on port 3 |
| 00:00:00:00:0B:53 | set smac = 00:00:00:00:F2:04 output on port 4 |

FIG. 4b

Subscriber Table — 430

| Direction | IP Address | Action |
|---|---|---|
| up | 1.2.3.4/32 | serv_set = {S1,S3} |
| down | 1.2.3.4/32 | serv_set = {S1,S3} |
| up | 1.2.3.5/32 | serv_set = {S2,S3} |
| down | 1.2.3.5/32 | serv_set = {S3,S4} |

*FIG_4c*

Application Table — 440

| Dir. | IP Address | Proto | Port | Action |
|---|---|---|---|---|
| up | 4.3.2.1/32 | TCP | 80 | serv_set = serv_set − {S3} + {S2} |
| down | 4.3.2.1/32 | TCP | 80 | serv_set −= {S3} |
| up | 3.2.1.0/24 | * | * | serv_set −= {S1} |
| down | 3.2.1.0/24 | * | * | serv_set −= {S1} |

*FIG_4d*

Path Status Table — 450

| Ingress Port | Action |
|---|---|
| 1 | serv_set −= {S2} |
| 2 | serv_set −= {S2} |
| 3 | serv_set −= {S2,S3} |
| 4 | serv_set −= {S1,S2,S3} |

*FIG_4e*

Next Destination Table — 460

| Dir. | Service Set | Action |
|---|---|---|
| up | S2 ∈ serv_set | set dmac = 00:00:00:00:0A:52<br>set smac = 00:00:00:00:F2:01<br>output on port 1 |
| up | S1 ∈ serv_set | set dmac = 00:00:00:00:0A:51<br>set smac = 00:00:00:00:F2:00<br>output on port 0 |
| up | S3 ∈ serv_set | set dmac = 00:00:00:00:0A:53<br>set smac = 00:00:00:00:F2:03<br>output on port 3 |
| up | S4 ∈ serv_set | set dmac = 00:00:00:00:0A:54<br>set smac = 00:00:00:00:F2:00<br>output on port 0 |
| up | serv_set == {} | set dmac = 00:00:00:00:00:02<br>set smac = 00:00:00:00:F2:00<br>output on port 0 |
| down | S2 ∈ serv_set | set dmac = 00:00:00:00:0B:52<br>set smac = 00:00:00:00:F2:02<br>output on port 2 |
| down | S3 ∈ serv_set | set dmac = 00:00:00:00:0B:53<br>set smac = 00:00:00:00:F2:04<br>output on port 4 |
| down | S4 ∈ serv_set | set dmac = 00:00:00:00:0B:54<br>set smac = 00:00:00:00:F2:00<br>output on port 0 |
| down | S1 ∈ serv_set | set dmac = 00:00:00:00:0B:51<br>set smac = 00:00:00:00:F2:00<br>output on port 0 |
| down | serv_set == {} | set dmac = 00:00:00:00:00:01<br>set smac = 00:00:00:00:F2:00<br>output on port 0 |

FIG. 4F

CHAINING OF INLINE SERVICES USING SOFTWARE DEFINED NETWORKING

This application claims the benefit of priority to previously filed U.S. Provisional Patent Application No. 61/624,823 entitled "CHAINING OF INLINE SERVICES USING SOFTWARE DEFINED NETWORKING" and filed on Apr. 16, 2012, the contents of which are incorporated herein by reference.

TECHNICAL FIELD

This invention relates generally to systems and methods for steering traffic through a chain of inline services using Software Defined Networking.

BACKGROUND

Mobile and fixed network operators use various types of middleboxes or inline services to inspect and alter network traffic transiting through their network. These middleboxes, which will be referred to as services in this document, are transparent to the end users and provide functionality such as transparent caching, virus scanning, and deep packet inspection. These services are usually packaged and sold as dedicated appliances (either physical or virtual) and are often expensive.

Operators are facing a sharp increase in traffic demand and continue looking at new ways to monetize their network. Due to the high cost of service appliances, operators want to avoid matching the capacity of these services with this growth. Operators would rather have the ability to selectively direct traffic to specific set of services instead of forcing all traffic through every service. This ability would allow an operator to steer video traffic, which is a source of the recent traffic explosion, away from expensive services such as deep packet inspection, thus reducing the need for investing in new service appliances.

The ability to steer particular classes of traffic through predefined sets of services can also be used to enable new streams of revenue for operators. An operator could offer services such as virus scanning or content filtering to customers who elect to pay for such services.

A service chain, or path, is an ordered set of services. Traffic steering is the action of classifying traffic and directing the different classes of traffic through specific service chains. Three broad classes of solutions are used today to implement some form of traffic steering and service chaining.

The first approach is to integrate the services as part of an extensible router or gateway. An operator can add new services by adding additional service cards to its router or gateway.

The second approach is to configure one or more static service chains where each service is configured to send traffic to the next service in its chain. A router using Policy Based Routing (PBR) classifies the incoming traffic and forwards it to services at the head of each chain based on the result of the classification.

A third approach is to use a router using PBR, and for each service to be configured, to return traffic back to the router after processing it. The router classifies traffic after each service hop and forwards it to the appropriate service based on the result of the classification.

All three classes of solutions have drawbacks. The first approach does not support the integration of existing third party service appliances. This solution is proprietary and service vendors must port their applications to the software and hardware configuration supported by the router or gateway. This solution potentially suffers from a scalability issue as the number of services and the aggregated bandwidth is limited by the router's capacity.

The second approach does not support the definition of policies in a centralized manner and instead requires that each service be configured to classify and steer traffic to the appropriate next service. This approach requires a large amount of service specific configuration and can be error prone. The second approach also lacks flexibility as it does not support the steering of traffic on a per subscriber-basis and limits the different service chains that can be configured. Getting around these limitations would require additional configuration on each service to classify and steer traffic and automated ways to push these configurations dynamically as subscribers connect to the network.

The third approach also suffers from scalability issues as traffic is forced through the router after every service. The router must be able to handle N times the incoming traffic line rate to support a chain with N−1 services.

Therefore, it would be desirable to provide a system and method that obviate or mitigate the above described problems.

SUMMARY

It is an object of the present invention to obviate or mitigate at least one disadvantage of the prior art.

In a first aspect of the present invention, there is provided a method for steering packet traffic, comprising receiving a packet and determining a direction the received packet is traveling. The received packet is associated with a service set and a position of the packet on the associated service set is determined. A next service on the associated service set is selected in accordance with the determined direction and position of the packet. A new destination is assigned to the packet in accordance with the selected next service.

In an embodiment of the first aspect of the present invention, the direction the received packet is traveling can be determined in accordance with an ingress port the packet was received on. The direction can be determined to be upstream or downstream.

In another embodiment, the step of associating the received packet with the service set can include assigning an ordered list of services to be applied to the received packet. Optionally, the received packet can be associated with the service set in accordance with the determined direction and a first header field of the packet. The first header field can be selected from a group consisting of a source address, a destination address, a source port, a destination port and a protocol.

In another embodiment, the step of associating the received packet with the service set can include assigning a default service to the received packet in accordance with an address associated with a subscriber. The address associated with the subscriber can be selected from a source address or a destination address of the received packet, in accordance with the determined direction. Optionally, the default service set can be modified in accordance with a second header field of the received packet. The second header field can be selected from a group consisting of a source address, a destination address, a source port, a destination port and a protocol.

In another embodiment, the position of the packet on the associated service set can be determined in accordance with an ingress port the packet was received on. Optionally, the method can include the step of modifying the associated service set in accordance with the determined direction and position of the packet, to remove services already applied to the received packet.

In another embodiment, the step of assigning a new destination to the packet can include rewriting a destination address of the packet. The method can optionally include the step of forwarding the packet to the assigned new destination. The step of forwarding can include selecting a port associated with the assigned new destination address, and transmitting the packet on the selected port.

In a second aspect of the present invention, there is provided a switch comprising a plurality of ports operatively connected to a processor. Each of the plurality of ports is for receiving and transmitting packets. The processor is for associating a packet received on a first port with a service set, for detecting a position of the received packet on the associated service set, for determining a next service on the associated service set in accordance with the detected position, for selecting a second port from the plurality of ports and for transmitting the packet to the determined next service on the selected second port.

In an embodiment of the second aspect of the present invention, the selected second port can be associated with the determined next service. Optionally, the plurality of ports can include an upstream-facing port for receiving packets traveling downstream from a service node and for transmitting packets travelling upstream to the service node, and a downstream-facing port for receiving packets traveling upstream from the service node and for transmitting packets travelling downstream to the service node.

In another embodiment, the processor can determine the direction the received packet is traveling in accordance with the first port. Optionally, the processor can associate the received packet with the service set in accordance with the determined direction and a first header field of the received packet.

In another embodiment, the processor can assign a default service set to the received packet in accordance with an address associated with a subscriber. The address associated with the subscriber can be one of a source address or a destination address of the received packet. Optionally, the processor can modify the default service set in accordance with a second header field of the received packet.

In another embodiment, the processor can determine the position of the received packet on the associated service set in accordance with the first port.

In another embodiment, the processor can assign a new destination to the received packet in accordance with the determined next service.

In another embodiment, the switch can further comprise a transit port for receiving a packet with no associated direction. The processor can forward the packet with no associated direction solely in accordance with its destination address.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 1 is a block diagram of an embodiment of a Service Network;
FIG. 2 is a flow chart of an exemplary data path method;
FIG. 3 is a configuration data example;
FIG. 4a is an exemplary direction table;
FIG. 4b is an exemplary MAC table;
FIG. 4c is an exemplary subscriber table;
FIG. 4d is an exemplary application table;
FIG. 4e is an exemplary path status table;
FIG. 4f is an exemplary next destination table.

DETAILED DESCRIPTION

Figure 5:
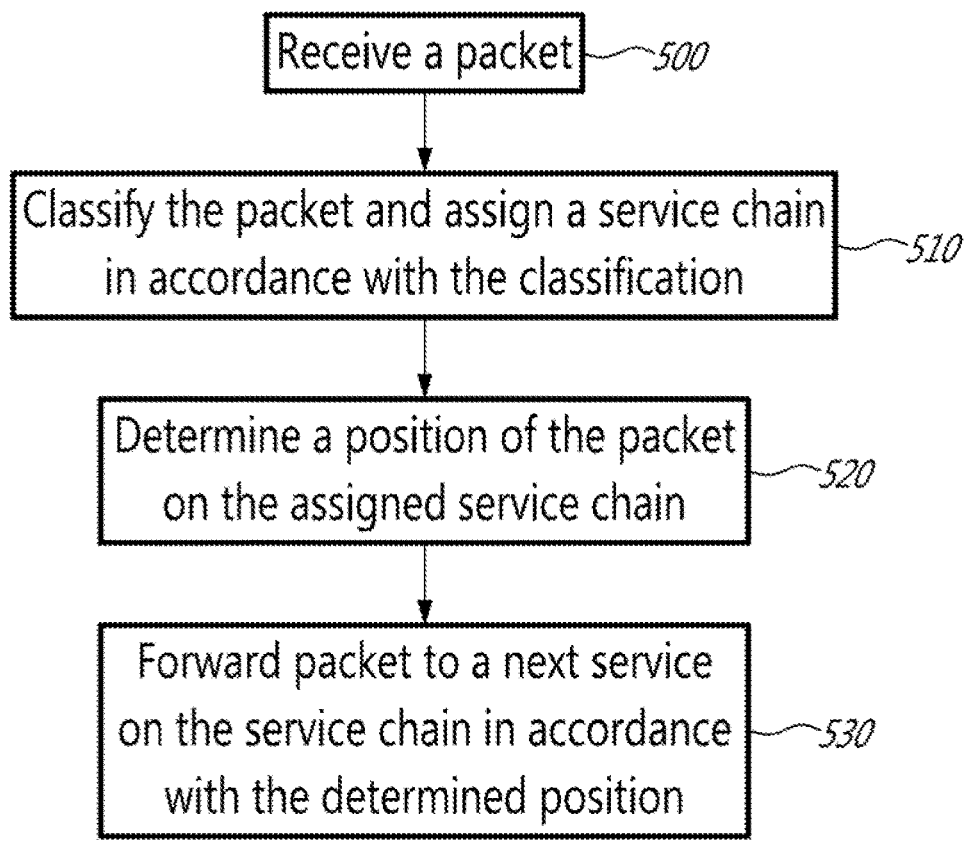
FIG. 5 is a flow chart illustrating an embodiment of the present invention.

The present invention is directed to a system and method for steering traffic through a set of services.

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

Some embodiments of the present disclosure will be discussed as using the OpenFlow protocol, but could be implemented with other types of Software Defined Networking (SDN). OpenFlow is a communications protocol that gives access to the forwarding plane of a network switch or router over the network. OpenFlow 1.1 supports multiple tables and a metadata field to exchange information between tables. The present disclosure takes advantage of these features to reduce the number of rules by avoiding cross-products that occur when flattening multi-step classifications.

In a service network, an operator is able to define service policies that specify traffic classes and the chain of services that each class must traverse. These policies are translated by the controller into rules that are programmed on the switches in the service network. These rules steer the network traffic through the ordered chain of services as specified by the policies.

Embodiments of the present invention provide flexibility as they support the integration of existing and third party services with no modifications. Service instances can be located and chained in an arbitrary fashion by the operator, and each service instance can be part of multiple service chains. The ability to steer traffic at the granularity of subscribers and traffic types is also provided.

The approach as discussed herein provides scalability in three distinct manners. First, it reduces the number of rules required to be stored in a switch by avoiding rule cross-product and, instead, using multiple tables combined with metadata to communicate information between tables. Second, the load is distributed across a network of switches instead of using a single, centralized router or load balancer, while still maintaining central control. Third, expensive forwarding operations such as classification and header rewriting are pushed to the perimeter of the service network, which can be beneficial in many ways. These operations need to be performed only once between services, regardless of the number of switch hops between them. Additionally, the need for aggregated throughput is often less at the perimeter of the network where the traffic has been distributed onto a plurality of switches. The present invention, combined with the use of virtual appliances running on commodity servers, enables pushing all expensive operations onto the software switch running on the virtual machine monitor.

A forwarding plane can be designed that uses multiple tables to reduce the total number of rules needed to support a given set of service policies.

An encoding of the service path in a metadata field can be designed that supports a large number of service chains and supports multiple instances per service. The encoding can be flexible and allow each service to be scaled independently.

A network organization can be provided so that expensive operations such as classification and header rewriting only need to be done once between services, regardless of the number of switch hops between them.

The traffic steering mechanism as described herein makes the following assumptions about the configuration of the network and the type of traffic that traverses it. 1) Every service is connected to a switch using two ports. Similar to routers and bridges, inline services are by definition traversed by traffic so this is a natural requirement. The services need to have a clear notion of upstream and downstream traffic and require the use of two ports. 2) The Service Network is bounded by a single gateway on each end. A single router connects the access network to the Service Network and a single router connects the Service Network to the Internet. 3) All services are addressable at the Ethernet layer. Some services may behave like bridges and may violate this assumption. 4) All traffic going through the Service Network is subscriber traffic. 5) Terminating services such as Internet Protocol Security (IPSec) gateways and Content Delivery Network (CDN) servers, which are communication endpoints, are located on a separate subnet connected to one of the gateway nodes.

Referring now to FIG. 1, an example service network 100 comprises perimeter switches PS1 102, PS2 104, and PS3 106 at the perimeter of the network, and an inner switch SW1 108 at the interior of the network. Perimeter switches 102, 104, 106 can be implemented with OpenFlow switches, while the inner switch 108 can be implemented with either an OpenFlow switch or a plain Ethernet switch. Services (such as service nodes S1 109, S2 110, S3 112, S4 114) and routers (such as R1 116, R2 118) are all connected to the perimeter of the service network 100. The entire steering network is a single Layer 2 domain. There can be multiple instances of a service, and each service instance has two communication interfaces connected to the service network 100 (potentially on different switches), one for each traffic direction. Service instances with more than two interfaces are also supported by the proposed traffic steering mechanism.

Perimeter switches 102, 104, 106 can have two types of input/output ports: node ports and transit ports. Services and routers are connected to node ports. Transit ports connect to other perimeter switches or to inner switches. In the exemplary service network 100, each perimeter switch 102, 104, 106 has at least one upstream facing node port, at least one downstream facing node port and at least one transit port. Each service node S1 109, S2 110, S3 112, and S4 114 is connected to a perimeter switch. Perimeter switches 102, 104, 106 are connected via inner switch 108.

Inner switches, such as 108, solely consist of transit ports and simply forward traffic based on their destination Media Access Control (MAC) address. These switches could therefore be implemented with plain Ethernet switches. Optionally, there can be advantages to using OpenFlow switches in the inner service network 100 to enable features such as multi-path support.

Incoming traffic, either coming in from a gateway node (such as routers R1 116 and R2 118), or coming back from a service, always enters the service network 100 via a perimeter switch and through a node port. Packets arriving through node ports are processed and steered towards the next node (which can be a service or a gateway) in their assigned service paths. Packets arriving on transit ports are simply forwarded using their destination MAC address.

Router 116 can connect the service network 100 to user equipment 120 and 122. Router 118 can connect the service network 100 to an internal network 124 and/or the Internet 126.

At a high level, traffic steering can be described a two step process. The first step classifies incoming packets and assigns them a service path based on predefined policies. The second step forwards packets to a "next" service based on its current position along its assigned service path. This two-step traffic steering process only needs to be performed once between any two nodes (service or router), regardless of the number of switches between them, when a packet arrives on a node port.

The traffic steering process described herein supports three types of service policies: subscriber-based policies, application-based policies, and flow-based policies. These policies can be specified by the operator and pushed to the relevant switches by a centralized controller (not shown in FIG. 1).

Subscriber-based policies are policies that are defined on a per subscriber basis. These policies specify the IP address of the subscriber and the set of services that each particular subscriber's traffic should traverse.

An application represents an end-user Internet application such as Youtube™, a type of traffic such as Hypertext Transfer Protocol (HTTP), or a combination of both. These types of policies are defined either in terms of an IP address block and/or a User Datagram Protocol (UDP)/Transmission Control Protocol (TCP) port. They are specified on a per application basis and apply to all subscribers. Application-based policies refine subscriber-based policies by adding or removing services from the set of services specified in the subscriber-based policies.

Flow-based policies are policies specific to a single flow or IP 5-tuple (i.e. source IP address, destination IP address, protocol, source port, destination port). They are used to dynamically override subscriber and application policies for specific flows. The forwarding rules derived from these policies can be pushed dynamically by the controller, even mid-flow, effectively re-steering a flow towards a different set of services.

Additionally, service ordering policies can be supported. Service ordering policies are different than the three types of service policies described above. They do not specify a mapping between traffic and services but instead specify the relative ordering between services for each traffic direction (upstream and downstream). The controller can transform these relative orderings into a global ordering and can use this ordering to convert the sets of services specified in the service policies into ordered service chains.

The datapath that implements the steering mechanism of embodiments of the present invention involves a number of table lookups. Forwarding decisions can be made based on the Layer 2-Layer 4 contents of a packet, as well as the ingress port that the packet was received on. In one implementation, a single Ternary Content Addressable Memory (TCAM) like table could be used to specify the required functionality, as in policy-based routing. However, this would not be a scalable solution as it would involve the cross-product of subscribers, applications, and ports in the same table. Using packet direction and multiple tables, this can be separated into multiple steps, resulting in a linear scaling of each table. There are multiple ways to separate the functionality across tables. Some tables may be combined when it does not introduce scalability problems.

Intermediate results from one table can be communicated to other tables using metadata, which can be used as part of a subsequent lookup key or be further modified. One important piece of metadata is the direction of traffic. All packets traversing a service network are considered to be traveling either upstream or downstream. Each node port in the steering network is either facing upstream or facing downstream. Referring back to FIG. 1, an example of perimeter switches 102, 104, 106 with both downstream-facing ports and upstream-facing ports are shown. All packets that arrive on a downstream-facing port are traveling upstream, and vice versa. Packets arriving on transit ports may be traveling in either direction. Their direction is known based on the destination MAC address, which will correspond to either an upstream-facing or downstream-facing service and/or router port.

Another piece of metadata is the set of inline services to be applied. This metadata can be encoded as a bit vector, one bit for each possible service. More sophisticated encodings can be used to enable more advanced features such as load balancing over multiple service instances. In the datapath, this metadata can be set, then modified, and finally used to select the next service to be applied.

FIG. 2 is a high-level flowchart of the datapath functionality according to an embodiment of the present invention. FIG. 2 illustrates an example methodology for processing and classifying a packet received by a perimeter switch, using a multi-table lookup approach. Service set and direction information associated with the packet are set and can be modified based on the results of each table lookup.

A packet is received by the switch, and the first table to be consulted is the direction table 202. It uses the ingress port the packet was received on as the key for the table lookup, and serves two purposes. First, to determine whether a packet has arrived on a node port or a transit port. Second, if the packet arrived on a node port, to determine in which direction the packet is headed. If the packet arrived on a downstream-facing port it is determined to be traveling upstream. If the packet arrived on an upstream-facing port it is determined to be traveling downstream. The direction bit is set accordingly in step 204. If the packet arrived on a transit port, it will "miss" the direction table and processing will proceed to the MAC table 206.

The lookup key for the MAC table 206 is the packet's destination MAC address. Based on the contents of this table, the packet will either be forwarded 208 directly to another transit or node port, or it will be dropped 210.

If there was a match, or "hit", in the direction table 202, the next table to be consulted is the microflow table 212. The key for this table lookup is the direction bit together with the 5-tuple (source and destination IP addresses, IP protocol field, and TCP/UDP source and destination ports) of the packet. The microflow table 212 contains exact-match entries used for selective dynamic steering of specific TCP/UDP flows. If there is a hit in microflow table 212, the service set is set accordingly in step 214.

If there is no exact match in the microflow table 212, the next table to be consulted is the subscriber table 216. The subscriber table 216 is used to get a subscriber's default service set for the current direction. The key for this table is the direction bit together with the subscriber's IP address. The subscriber's IP address comes from one of either the source or destination IP address fields, depending on the direction of the packet. For example, if the direction of the packet is "upstream", the subscriber's IP address is determined to be the source IP address of the packet. This table can be a longest-prefix match (LPM) lookup table. If there is a miss in the subscriber table 216, the default action is to drop the packet in step 218. If there is a match in the subscriber table 216, the service set metadata is set with the subscriber's default services in 220.

Following the subscriber table 216 is the application table 222. In this context, "application" refers to the remote communication endpoint, as identified by the IP address and/or protocol and/or port number. It is used to modify the subscriber's default service set according to any static Layer 3-Layer 4 application policies. Similar to as described for the subscriber table 216, the application IP address can be the source or destination IP address of the packet, depending on its direction. Wildcards, prefixes, and ranges can be permitted in this table lookup. Based on this information, specific services can be excluded from the service set or added to it in step 224. If there is a miss in the application table 222, the packet is not dropped and the service set is not modified.

The path status table 226 follows the application table 222 or the microflow table 212. The purpose of the path table 226 is to determine which services in the service set have already been applied to the packet, and thus, the position of the packet on the service path. This is important because a packet may traverse the same perimeter switch multiple times, and it should be treated differently each time. The ingress port the packet was received on is sufficient to provide this information. If path status table 226 is reached, it means that the packet has arrived on a node port, connected directly to a service or router. The ingress port provides information regarding which service was just applied, if any, and the direction. There is a global ordering of services in each direction (which may or may not be the exact reverse of each other) of a service set. Based on the direction and the previous service, the service set field is modified in 228 to exclude the previous service and all other services that precede it.

The final table along the node port path is the next destination table 230. It uses the direction bit and the service set field as a key. The next destination table 230 can be a TCAM-like table, with arbitrary bitmasks and rule priorities. Based on the direction bit, it can scan the bits in the service set according to the global service ordering in that direction. The first, or highest-priority, service it finds will be the next destination. If the service set is empty, the next destination will be either the upstream or downstream router, depending on the direction bit. The next destination can be connected to the current switch or another one. If the destination is connected to a different switch, then the destination MAC address is set to the value corresponding to that service or router and the packet is transmitted 232 out an appropriate transit port. If the destination is directly connected, then the MAC addresses are updated as needed and the packet is transmitted 232 out the corresponding node port.

Table 1 is a summary of the tables described above, specifying the types of rules that are installed in each.

TABLE 1

| Table | Rule Profile | Result information |
| --- | --- | --- |
| Direction Table | exact match (ingress port) | direction |
| MAC Table | exact match (destination MAC address) | forwarding information |
| Microflow Table | exact match (direction, source address, destination address, protocol, source port, destination port) | service set |
| Subscriber Table | exact match (direction), prefix (subscriber's IP address) | service set |
| Application Table | exact/wildcard match (direction), prefix (application IP address), exact/wildcard match (protocol), range (application port) | modify service set |
| Path Status Table | exact match (ingress port) | modify service set |
| Next Destination Table | exact match (direction), bitmask (service set) | forwarding information |

MAC addresses have been discussed as a means to direct packets to specific node ports on remote perimeter switches, optionally across a standard Ethernet LAN. Special care should be taken to handle MAC addresses in order to interoperate with and make efficient use of the Ethernet core (if it exists), as well as the inline service boxes.

A mechanism can be provided for the Ethernet core network to learn all the MAC addresses it will need to use for its forwarding tasks. One way to accomplish this is for the steering network controller to cause specially-crafted Ethernet frames to be transmitted periodically from the transit ports of the perimeter switches that are connected to the Ethernet core, with source MAC addresses corresponding to those of all service and router ports that should be reached through those transit ports. It is possible to have multiple links between an Ethernet switch and a perimeter switch, with each link carrying traffic destined to different services.

Other packets transmitted on transit ports (i.e. user traffic) should not confuse the bridge tables of the core Ethernet switch(es). This means that each transit port connected to the Ethernet core should use a different source MAC address for user traffic. This can be a unique MAC address which is not used as a destination, or it can be a MAC address of one of the services corresponding to that transit port. This assumes that there is in fact a standard Ethernet core. Perimeter switches may also be directly connected to each other. If there is no Ethernet core, source MAC addresses across transit ports will not matter.

The services themselves may have special requirements for MAC addresses. For example, the service interfaces can be configured with MAC addresses, and the service can expect packets destined to it to have the correct destination MAC address. In this case, the source and destination MAC addresses should be set in order to accommodate this. On the other hand, services can be transparent at the Ethernet layer. In that case, they could simply pass through traffic from one port to the other, or they could employ a type of MAC learning. If the service performs MAC learning, the steering network should accommodate it by sending upstream packets with one source MAC address and downstream packets with another source MAC address. The destination MAC address would preferably be the source in the opposite direction.

The datapath as described in FIG. 2 has been focused on subscriber data traffic, for simplicity purposes. It may be necessary to handle different types of control traffic as well. At minimum, Address Resolution Protocol (ARP) should be supported at the router ports and possibly the service ports as well. In order to support these control protocols, the first table can be enhanced to allow matching on various Layer 2-Layer 4 fields such as Ethertype, IP protocol, etc., and the ability to trap packets to the controller.

In an alternative scenario, two subscribers can be communicating with each other. In this case, it is still necessary to apply all relevant services of each subscriber's traffic, particularly if these are security-related services. The downstream router should not bypass the steering network in this situation. When this happens, the traffic will traverse the steering network twice between the two endpoints: once upstream and once downstream. In the upstream direction, one subscriber's services will be applied. In the downstream direction, the other subscriber's services will be applied. This is accounted for in the mechanism as described herein. The upstream router can be expected to return the traffic back into the steering network.

Some service nodes might not need to see the same packet twice. Additionally, there may be issues associated with seeing subscriber IP addresses on both sides of a service (for example, if the service performs routing). A rule in the application table can be implemented in order to bypass services in one direction for traffic between subscribers.

An implementation of the example datapath of FIG. 2 using the OpenFlow 1.1 protocol forwarding model will be readily understood by those skilled in the art. The metadata items (direction and service set) are encoded into OpenFlow's 64-bit metadata field. This requires one bit for the direction and leaves up to 63 bits for encoding the service set, allowing a maximum of 63 distinct services. OpenFlow 1.1 supports matching on the metadata field using an arbitrary mask and supports update to the metadata field based on the following equation: meta=(meta & ~mask)|(value & mask). The value and mask can be arbitrary 64 bit numbers.

Table 2 is a summary of the example OpenFlow 1.1 switch table actions, as described above.

TABLE 2

| Table | Match Fields | Hit | Miss |
| --- | --- | --- | --- |
| Table 0 (direction/control traffic) | ingress port, all L2-L4 fields | set direction bit in metadata field, go to table 2 or output to controller | continue |
| Table 1 (MAC) | destination MAC address | set MAC addresses, output | drop |
| Table 2 (microflow) | metadata direction bit, source IP address, destination IP address, protocol, source port, destination port | set metadata service bits, go to table 5 | continue |
| Table 3 (subscriber) | metadata direction bit, source IP address, destination IP address | set metadata service bits, go to table 4 | drop |
| Table 4 (application) | metadata direction bit, source IP address, destination | update metadata service bits, go to table 5 | continue |

TABLE 2-continued

| Table | Match Fields | Hit | Miss |
|---|---|---|---|
| Table 5 (path status) | IP address, protocol, source port, destination port ingress port | update metadata service bits, go to table 6 | drop |
| Table 6 (next destination) | metadata direction and service bits | set MAC addresses, output | drop |

It should be noted that the Subscriber Table of the flow chart in FIG. 2 extracted the subscriber's IP address based on the direction of a packet. In the OpenFlow implementation example of Table 2, both source IP address and destination IP address are included instead as match fields, as well as the metadata field which has the direction bit. Rules installed in this table will either have source or destination IP address as a wildcard, with the corresponding direction bit in the metadata field, and all other metadata bits masked.

The same concept described in the Subscriber Table applies to the Application Table as well. Because OpenFlow 1.1 does not support port range or mask, the current implementation of the steering mechanism is limited to exact match on source and/or destination ports.

To further illustrate embodiments of the present disclosure, an example based on the topology in FIG. 1 will be described. FIG. 3 illustrates an example of configuration data 300 containing configuration information to be used in combination with the topology of FIG. 1 to derive the table entries for the datapath of perimeter switch PS2 104. Configuration data 300 includes subscriber information, service information, router information, application information, and a global service ordering. Most of the tables are fairly static, meaning they only change when the configuration changes.

FIGS. 4*a*-4*f* illustrate the example table entries that would be populated and stored in perimeter switch 104 in the topology of FIG. 1, according to the configuration information of FIG. 3. One table which is not explicitly shown in this example is the Microflow Table. This is because the microflow information is not derived from the static configuration, but rather from dynamic flow analysis. When a dynamic policy (i.e. based on Layer 5-Layer 7 information) dictates that a specific microflow should be re-steered, it will install the corresponding microflow rules in the relevant switches. Examples will be presented on how the metadata field is matched or updated for each table. These examples are based on a 5 bit metadata field (one direction bit, 4 service bits) with the most significant bit representing the direction.

FIG. 4*a* illustrates an example Direction Table 410. The Direction Table 410 includes rows 412, each containing an Ingress Port 412*a* and an associated Action 412*b*. The direction (upstream or downstream) of a packet is determined by the ingress port the packet arrived on. For example, for a packet received on Ingress Port 1, the direction metadata will be set to "downstream" as shown in row 412'. In this embodiment, the value one represents the upstream direction and the value zero represents the downstream direction. For the second rule, in row 412", the metadata field would be updated as follows:

meta=(0&01111*b*)|(10000*b*&10000*b*)=10000*b*

FIG. 4*b* illustrates an example MAC Table 420. The MAC Table 420 includes rows 422, each containing a Destination MAC Address 422*a* and an associated Action 422*b*. The action for the MAC Table 420 is to set the source MAC Address (smac) and select which port to transmit the packet on, based on the corresponding destination MAC address.

FIG. 4*c* is an example Subscriber Table 430. The Subscriber Table 430 includes rows 432, each containing a Direction 432*a*, an IP Address 432*b*, and an Action 432*c*. The action for the Subscriber Table sets the service bits in the metadata field based on the appropriate service set for the subscriber's IP address, while keeping the direction bit unmodified. For the first rule, the service bits for S1 and S3 are set as follows:

meta=(10000*b*&10000*b*)|(00110*b*&01111*b*)=10110*b*

FIG. 4*d* is an example Application Table 440. The Application Table 440 includes rows 442, each containing a Direction 442*a*, an IP Address 442*b*, a Protocol 442*c*, a Port 442*d*, and an associated Action 442*e*. The action for the Application table is to update or modify the service bits if there is a match in this table. A subset of the service bits are either set or cleared. The direction bit is not modified. For the first rule, the bit for S2 is set, and the bit for S3 is cleared. The bits corresponding to services being added or removed are set in the mask field. The value field contains the new status (present or not) for these services:

meta=(meta&10101*b*)|(01000*b*&01010*b*)

FIG. 4*e* is an example Path Status Table 450. The Path Status Table 450 includes rows 452, each containing an Ingress Port 452*a* and an associated Action 452*b*. The action for the Path Status table is to clear bits corresponding to the previous service in the assigned service set, and all services preceding it. For the third rule, the metadata field would be updated as follows:

meta=(meta&10011*b*)|(0&01100*b*)

FIG. 4*f* is an example Next Destination Table 460. The Next Destination Table 460 includes rows 462, each containing a Direction 462*a*, a Service Set 462*b*, and an associated Action 462*c*. The bits corresponding to any previous services have been cleared in the Path. Status table and the lookup in the Next Destination table finds the highest remaining bit to determine the next service in the chain. As examples, the matching on the metadata field for the first three rules would be as follow (bits set to X are masked during matching):

Rule 1: meta==11xxx
Rule 2: meta==101xx
Rule 3: meta==1001x

Some possible extensions to the above examples will now be discussed. If a single physical service middlebox is insufficient to deliver the required throughput, multiple instances of that service can be connected to the steering network, and the steering network can distribute traffic among them without the need for a separate load balancer. This can be done without modifying the forwarding plane mechanisms that have been described.

The subscriber table 430 and the microflow table (not shown) can have the ability to set the service set metadata to a controller-specified value. The application table 440 and the path status table 450 can have the ability to modify select controller-specified bits in the service set metadata. The next destination table 460 can have the ability to mask and match on select controller-specified bits in the service set metadata. So, the controller can play with the format of these bits. In a simple case, as has been described, one bit represents a service (indicating whether or not it should be applied), and there is only one instance of each service. This encoding can be extended such that select services can additionally have an instance identifier included in the metadata. If n bits are allocated to such an identifier, then up to $2^n$ service instances can be represented. With a fixed number of bits available, this is a trade-off between the maximum number of services and the number of instances per service. Each service can use a different number of bits for the instance identifier.

In an exemplary encoding scheme, the metadata field is 64 bits wide. One bit is the direction bit, indicating upstream or downstream traffic. Three bits are unused. Service chains are composed from a set of 13 different services. Two of the services are represented using 8 bits (1 apply bit, 7 bits used as instance identifiers), allowing for up to 128 instances per service. The remaining 11 services are represented using four bits (1 apply bit, 3 instance identifier bits), allowing for up to eight instances per service.

The instance identifiers can be set together with the default service set in the subscriber table 430. Once set, the instance identifier bits are not modified by the subsequent application table 440. The application table 440 only modifies the flag bits which indicate whether the service should be applied. This enables load balancing at the granularity of subscribers, even for cases where a service is not part of the subscriber's default service set. Given the large number of subscribers, it is expected that this granularity of load balancing will be sufficient.

The service path encoding as described herein can be extended to address two potential limitations. First, an ordering of services can be imposed in each direction (upstream vs. downstream). For a given direction, if the following ordering constraints A→B and B→C are defined then the ordering constraint C→A would be rejected. Second, the total number of services supported can be limited to the maximum number of services that can be encoded in a service path.

These two limitations can be relaxed, by introducing the option of path groups. The direction bit can be enhanced with additional bits to support multiple groups of service path in each direction. For example, using seven additional bits allows defining up to 128 path groups in each direction. Different sets of services and ordering constraints can be defined for each path group. The number of bits used to represents the instances of a given service can also vary between path groups providing additional flexibility.

To define a service path that would not be allowed due to previously specified ordering constraints, a new path group can be defined with its own set of ordering constraints, addressing the first limitation. The use of path groups would not change the maximum number of services that can be part of a service path but would increase the size of the pool of services from which services are selected to be part of one or more service paths. Using path groups can increase the size of the Status Table and the Destination Table. Both of these tables will grow linearly with the number of path groups defined.

The steering mechanism as described herein uses two rules per subscriber, potentially resulting in a large subscriber policy rule table. The size of this table can be reduced if IP addresses were assigned to subscribers based on their pre-defined service set. Using this approach, per subscriber rules would be replaced by per service set rules, greatly reducing the number of rules. This type of solution could potentially be deployable in a network where most subscribers are assigned dynamic IP addresses.

A router will use its routing table to determine the next hop and set the destination MAC address accordingly. The service network will rewrite the MAC address to steer packets towards services, overwriting the destination gateway node, and therefore cannot be treated as a transparent Layer 2 segment. In the case of a single router at each end, this is not a problem, since the traffic direction, which is known, is sufficient to identify the destination router. In the case of multiple routers, some mechanism is needed to direct traffic to the proper router.

The steering network can essentially be treated as a router. Connected routers would then have routes directing traffic into the steering network, and the steering network can direct traffic from there. For subscriber traffic, the existing steering mechanisms can be used to allow more than a single upstream and a single downstream router. This can be viewed as being similar to the concept of multiple service instances. A router identifier (similar to a service instance identifier) can be set in the Subscriber Table 430 (for downstream traffic), in the Application Table 440 (for upstream traffic), or even in the Microflow Table (for upstream and downstream traffic). This is a matter of metadata encoding, and some number of bits can be allocated to this. Each router would still be considered an upstream or downstream router for subscriber traffic. Alternatively an extra table containing routing information could be added.

It is has been assumed, for the example embodiments described herein, that all traffic forwarded by the steering network is subscriber traffic. For non-subscriber traffic, we can treat the steering network as a simple router. Instead of dropping packets that miss in the Subscriber Table 430, they can be sent to a regular route table which does conventional destination-IP-based forwarding. Based on the route lookup, the same mechanisms can be used to output to a local node port or send it to a remote node port across the Layer 2 core network. Non-subscriber traffic would not traverse any inline services.

It has also been assumed that the switch ports will be physical ports, but virtual ports can be supported as well using VLAN tags and virtual interfaces on the service. Virtual ports can be used to reduce the number of physical ports required.

The steering mechanism described herein can be implemented using a protocol that supports multiple tables and a metadata field which can be used to exchange information when processing packets through multiple tables. The steering mechanism leverages these two features to reduce the total number of rules to be stored in each switch and to avoid relying on expensive TCAM technology as much as possible. The steering mechanism can have large tables, such as the Subscriber Table and the Microflow Table, but these are longest prefix match and exact match tables which can be implemented efficiently in RAM. In alternative implementations, which only support a single table, all valid combinations of input port, subscriber, and application policy have to be encoded as individual rules. This rule cross-product will result in a very large table, and because these rules will contain wildcards and masks this table will suffer from scalability and/or performance issues.

Alternative approaches can be implemented for steering traffic as will be readily understood by those skilled in the art. One approach is to tag each packet with additional information identifying the service chain or the set of services to visit. This additional information can either be a flat label identifying the entire service path or a stack of labels where each label identifies a service to visit.

With the flat label approach, packets are steered based on the incoming port and the value of the label. Packets are classified once when they enter the Service Network for the first time. Virtual local area network (VLAN) tags can be used as flat labels, but this approach may be problematic.

Many services will strip the Layer 2 header, discarding the VLAN tag and forcing a reclassification afterward. The VLAN tag is 12 bits wide, limiting the number of service paths to 4096. This number could become a limitation once the needs to account for direction and to support multiple service instances are considered.

With the stacked labels approach, the ordered set of services to visit is described as a stack of labels. The label at the top of the stack identifies the next service to visit and after each service this label is popped off the stack. A packet exits the network once its stack is empty. This approach could be implemented using Multiprotocol Label Switching (MPLS) labels. In addition to the problem of services stripping away Layer 2 headers, many services may not be able to handle packets with MPLS headers.

In another alternative embodiment, packets can be reclassified at every switch hop between services, instead of only doing it once at the perimeter switch. This approach does not require rewriting the destination MAC address but requires a reclassification at every switch hop, precluding the use of a simpler forwarding mechanism in the inner network where the aggregated bandwidth requirements are higher than at the perimeter. This approach also requires the use of a distinct labelling mechanism (such as using tunnels) for links that are traversed multiple times within the same service path.

FIG. 5 is a flow chart illustrating a method of the present invention. The method begins in step 500 when a packet is received by a perimeter switch in a network. The packet is classified in step 510, and a service chain is assigned to the received packet in accordance with the classification operation. The position of the received packet on the assigned service chain is determined in 520. The position on the service chain can be determined in accordance with the port on which the packet was received. A direction of the received packet can also be optionally determined based on the port the packet was received on. The packet is forwarded to the next service on the assigned service chain in accordance with determined position of the received packet in 530. The next service can optionally be determined in accordance with the determined direction, in addition to the determined position on the service chain. Step 530 can include assigning a new destination address to the received packet in accordance with the next service to be performed. The packet can be forwarded to the next service by selecting a port associated with the next service.

Figure 6:
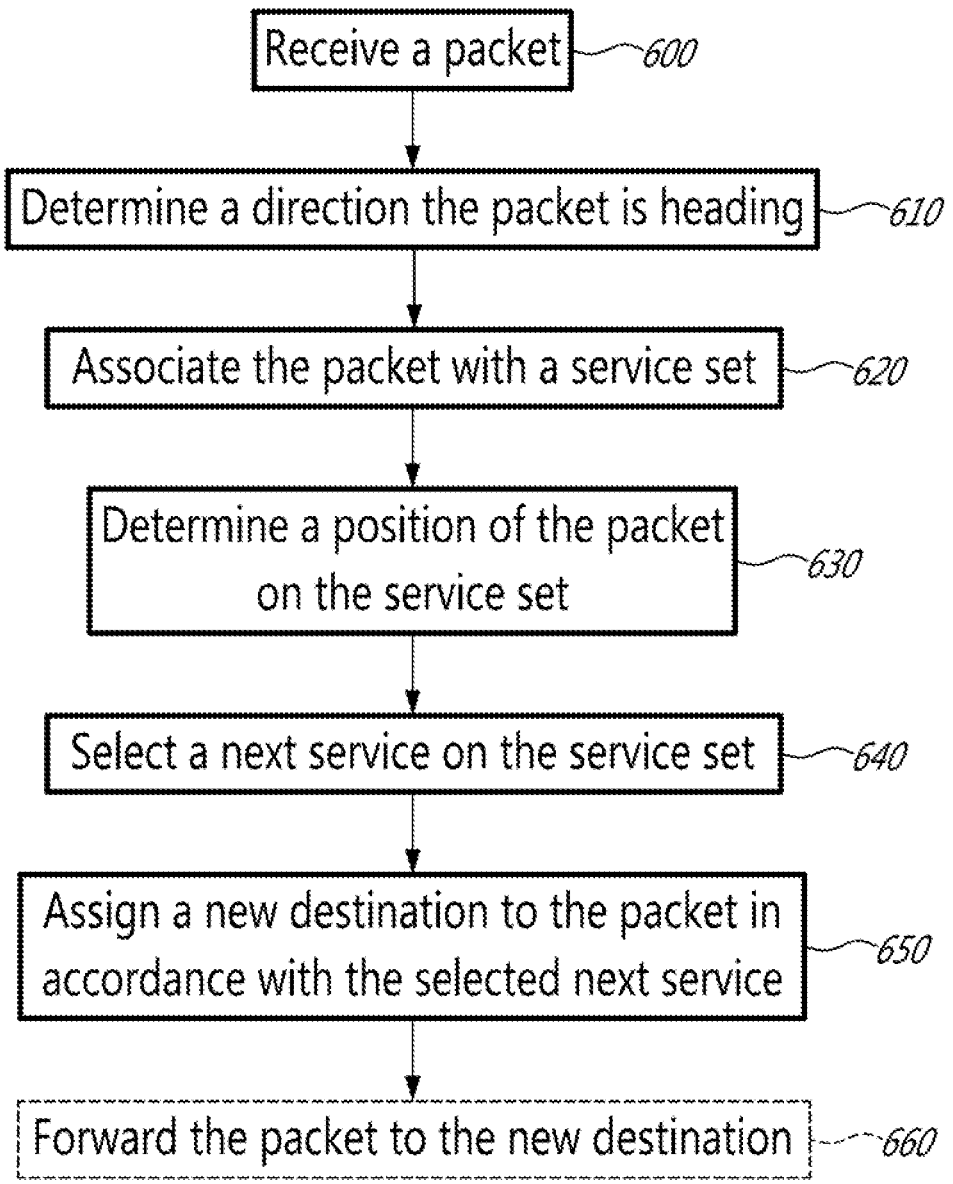
FIG. 6 is a flow chart illustrating another embodiment of the present invention.

FIG. 6 is a flow chart illustrating another embodiment of the present invention. The process begins by receiving a packet in step 600. The direction the packet is traveling is determined in 610. The direction the received packet is traveling can be upstream or downstream, and can be determined in accordance with the ingress port the packet was received on.

In 620, the received packet is associated with a service set. Associating the packet with the service set can include assigning an ordered list of services to be applied to the packet in accordance with at least one header field of the packet. The at least one header field can be selected from a group including: a source address, a destination address, a source port, a destination port or a protocol. The service set can also be assigned in accordance with the determined direction the packet is heading. The assigned ordered list of services can be attached to the received packet as metadata.

A default service set can be associated with the packet in accordance with an address associated with the subscriber. The subscriber address can be identified as one of the source address or the destination address of the received packet, in accordance with the determined direction. The default service set can optionally be modified in accordance with at least one header field of the received packet.

In step 630, the position of the packet on the associated service set is determined. The position of the packet on the service set can be determined in accordance with the ingress port the packet was received on. Both the last service applied, and thus all previous services applied, can be determined based on the current position of the packet in the service set and the direction the packet is heading. A next service on the associated service set to be applied to the packet is selected in step 640. The next service is selected in accordance with the determined direction and position of the packet. The associated service set can optionally be modified, in accordance with the determined direction and position of the packet, to remove services already applied to the packet.

In step 650, a new destination is assigned to the packet in accordance with the selected next service. Assigning a new destination to the packet can include rewriting a destination address associated with the packet. Optionally, the packet is forwarded to the new destination in 660. The step of forwarding the packet can include selecting a port associated with the new destination, and transmitting the packet to the selected next service through that port.

Figure 7:
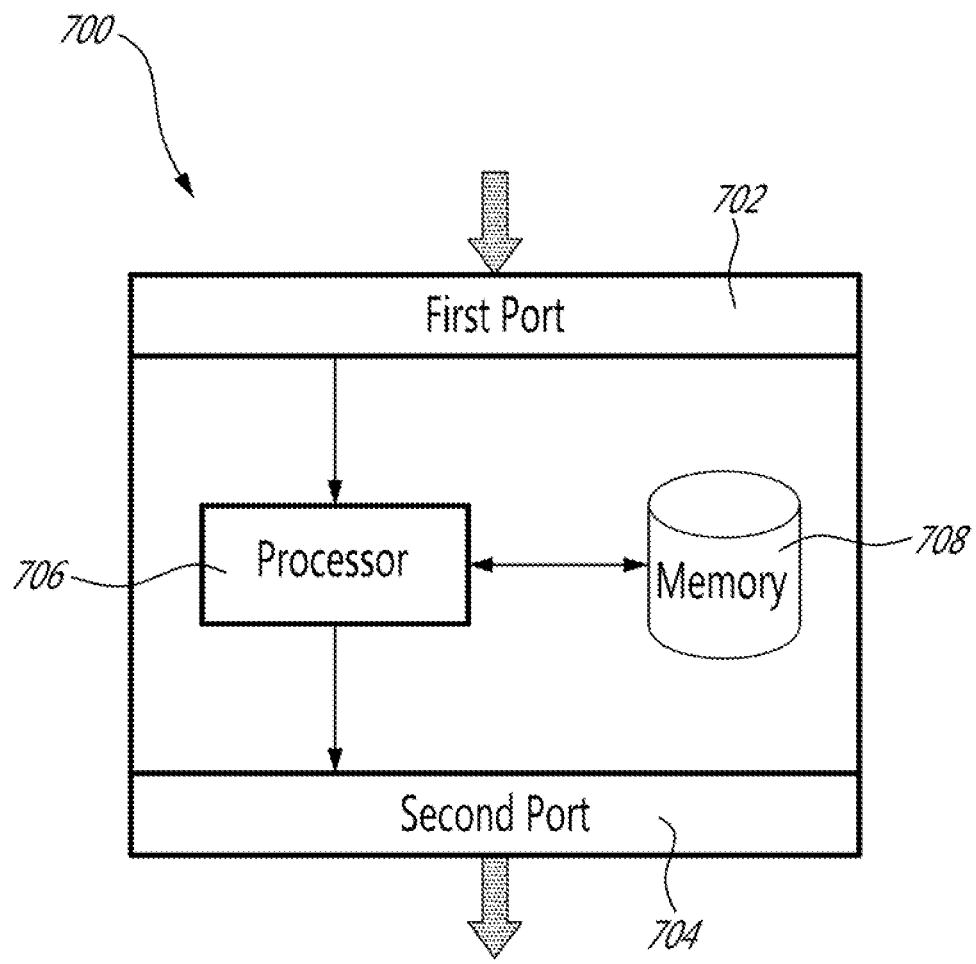
FIG. 7 is a block diagram of an example switch.

FIG. 7 is a block diagram of a switch 700 according to embodiments of the present invention. The switch 700 can be a perimeter switch in a service network and can implement the functionality as described herein. The switch 700 comprises a plurality of input/output ports for transmitting and receiving packets. The plurality of ports includes a first port 702 and a second port 704. The first port 702 and second port 704 may be implemented as a single, physical communication interface. A processor 706 is operatively connected to the input port(s) 702, the output port(s), and a memory or data repository 708. The memory 708 can be internal or external to the switch 700, and is accessible by the processor 706.

The processor 706 is configured to associate a packet received on the first port 702 with a service set. The processor 706 detects a position of the received packet on the associated service set and determines a next service on the associated service set in accordance with the detected position. The processor 706 can select the second port 704 for transmitting the packet to the determined next service. The second port 704 can be associated with the next service and is selected from the plurality of ports.

The plurality of ports can include at least one port designated for transmitting downstream-traveling packets and for receiving upstream-traveling packets to and from a service node. At least one other port can be designated for transmitting upstream-traveling packets and receiving downstream-traveling packets to and from the same service node.

The processor 706 can determine the direction (upstream or downstream) the received packet is heading in accordance with the first port 702 that the packet was received on. The processor 706 can associate the received packet with the service set based on the determined direction and a header field of the packet.

As part of associating a packet with a service set, the processor 706 can assign a default service set to the packet in accordance with an address associated with a subscriber. The subscriber can be identified by either the source address or the destination address of the packet, depending on the direction the packet is heading. The processor 706 can further modify the default service set in accordance with at least one other header field of the packet.

The processor 706 can determine the position of the received packet on the associated service set based on the first port 702 that the packet was received on. The processor 706 can assign a new destination to the received packet in accordance with the determined next service.

Switch 700 can optionally also include a transit port for receiving packets with no associated upstream or downstream direction. The processor 706 forwards packets received on the transit port solely in accordance with their destination address. The switch 700 can include one, or several, transit ports. Packets received on transit ports can be forwarded to their destination via the plurality of ports (including first port 702 and second port 704) or via a transit port.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for steering packet traffic, comprising:
   receiving a packet;
   determining a direction the received packet is traveling;
   determining a service set for the received packet based at least in part on the determined direction, the service set identifying a plurality of services;
   determining a position of the packet in the determined service set by determining which services in the service set have been applied to the packet;
   selecting a next service in the determined service set in accordance with the determined direction and position of the packet; and
   assigning a new destination to the packet in accordance with the selected next service.

2. The method of claim 1, wherein the direction the received packet is traveling is determined in accordance with an ingress port the packet was received on.

3. The method of claim 1, wherein determining the service set includes assigning an ordered list of the plurality of services to be applied to the received packet.

4. The method of claim 1, wherein the received packet is associated with the service set in accordance with a first header field of the packet.

5. The method of claim 4, wherein the first header field is selected from a group consisting of a source address, a destination address, a source port, a destination port and a protocol.

6. The method of claim 1, wherein determining the service set for the received packet includes assigning a default service set to the received packet in accordance with an address associated with a subscriber.

7. The method of claim 6, wherein the address associated with the subscriber is selected from one of a source address and a destination address of the received packet, in accordance with the determined direction.

8. The method of claim 6, further including modifying the default service set in accordance with a second header field of the received packet.

9. The method of claim 8, wherein the second header field is selected from a group consisting of a source address, a destination address, a source port, a destination port and a protocol.

10. The method of claim 1, wherein the position of the packet in the determined service set is determined in accordance with an ingress port the packet was received on.

11. The method of claim 1, further including modifying the determined service set in accordance with the determined direction and position of the packet, to remove services already applied to the received packet.

12. The method of claim 1, wherein assigning a new destination to the packet includes rewriting a destination address of the packet.

13. The method of claim 1, further including forwarding the packet to the assigned new destination.

14. The method of claim 13, wherein forwarding includes selecting a port associated with the assigned new destination address, and transmitting the packet on the selected port.

15. A switch, comprising:
   a plurality of ports, each of the plurality of ports for receiving and transmitting packets; and
   a processor, operatively connected to the plurality of ports, for:
      determining a service set for a received packet based at least in part on a determined direction, the service set identifying a plurality of services;
      detecting a position of the received packet in the determined service set by determining which services in the service set have been applied to the packet;
      determining a next service on the determined service set in accordance with the detected position; and
      selecting a second port from the plurality of ports and for transmitting the packet to the determined next service on the selected second port.

16. The switch of claim 15, wherein the selected second port is associated with the determined next service.

17. The switch of claim 15, wherein the processor is configured to determine the direction the received packet is traveling in accordance with the first port.

18. The switch of claim 17, wherein the processor associates the received packet with a first header field of the received packet.

19. The switch of claim 15, wherein the determining of the service set for the received packet includes determining a default service set for the received packet in accordance with an address associated with a subscriber.

20. The switch of claim 19, wherein the address associated with the subscriber is one of a source address and a destination address of the received packet.

21. The switch of claim 19, wherein the processor is configured to modify the default service set in accordance with a second header field of the received packet.

22. The switch of claim 15, wherein the processor is configured to determine the position of the received packet on the associated service set in accordance with the first port.

23. The switch of claim 15, wherein the processor is configured to assign a new destination to the received packet in accordance with the determined next service.

24. The switch of claim 15, further comprising a transit port for receiving a second packet, and wherein the processor forwards the second packet solely in accordance with its destination address.

* * * * *